United States Patent
Wang et al.

(10) Patent No.: US 10,909,283 B1
(45) Date of Patent: Feb. 2, 2021

(54) HARDWARE ASSISTED WEIGHTED TOGGLE COUNT

(71) Applicant: Cadence Design Systems, Inc., San Jose, CA (US)

(72) Inventors: Long Wang, Shanghai (CN); Tsair-Chin Lin, San Jose, CA (US); Jingbo Gao, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 23 days.

(21) Appl. No.: 16/198,163

(22) Filed: Nov. 21, 2018

(51) Int. Cl.
| | |
|---|---|
| *G06F 30/327* | (2020.01) |
| *G06F 1/28* | (2006.01) |
| *G06F 30/33* | (2020.01) |
| *G06F 30/398* | (2020.01) |
| *G06F 111/04* | (2020.01) |
| *G06F 119/06* | (2020.01) |

(52) U.S. Cl.
CPC .............. *G06F 30/327* (2020.01); *G06F 1/28* (2013.01); *G06F 30/33* (2020.01); *G06F 30/398* (2020.01); *G06F 2111/04* (2020.01); *G06F 2119/06* (2020.01)

(58) Field of Classification Search
USPC ....................................................... 716/103
See application file for complete search history.

(56) References Cited

U.S. PATENT DOCUMENTS

2012/0210291 A1* 8/2012 Gu .......................... G06F 30/33
716/136

OTHER PUBLICATIONS

Ofori-Attah, E., et al., "Architectural Techniques for Improving the Power Consumption of NoC-Based CMPs: A Case Study of Cache and Network Layer", J. Low Power Electron. Appl. 2017, 7, 14; doi:10.3390/jlpea7020014, 24 pages.

* cited by examiner

*Primary Examiner* — Bryce M Aisaka
(74) *Attorney, Agent, or Firm* — Vista IP Law Group, LLP

(57) ABSTRACT

A method for receiving a circuit layout including modules in a hierarchical structure. The method includes selecting a module in the hierarchical structure, identifying multiple toggling netlists in the module during multiple clock cycles, grouping the toggling netlists into clusters based on a toggle weight factor, and finding an average toggle weight factor for each cluster. The method includes generating instrument logic to determine a power consumption of the circuit layout based on a number of toggling netlists in each cluster for each clock cycle, and on the average toggle weight factor for each cluster, merging, with a compiler tool, the instrument logic with the circuit layout into an executable file for an emulator tool. The method includes evaluating the power consumption of the circuit layout with the emulator tool; and modifying the circuit layout when the power consumption of the circuit layout exceeds a pre-selected threshold.

21 Claims, 12 Drawing Sheets

HARDWARE ASSISTED WEIGHTED TOGGLE COUNT

TECHNICAL FIELD

Embodiments described herein are generally related to the field of circuit simulation in circuit modeling and fabrication. More specifically, embodiments described herein are related to systems and methods to estimate weighted toggle count (WTC) in real time during circuit emulation and accurately assess power consumption in circuit designs.

BACKGROUND

The underlying principle of power analysis to calculate the power consumed by a circuit includes multiple contributions. Some contributions include a leakage power, reflecting a logic state of the device. The leakage power may be dependent on the leakage current that flows between the source and drain of a transistor (e.g., in a complementary metal-oxide-semiconductor—CMOS—configuration).
Some other contributions to power consumption may include an internal power, indicating the power used by the logic gates (cells) when a driver is switching (toggling). Accordingly, the internal power contribution may be obtained as a product of a toggle count times a cell transition power (e.g., the power used by a cell when there are transitions on the input pins). Further, another contribution to power consumption may include a net power, which indicates the impact of net loading when a driver is switching, that is, $$P_{net} = \frac{1}{2} \cdot C \cdot V^2 \cdot T_C \quad (1)$$

Where C is the capacitive coupling of the net, V is the operating voltage (turn 'on' 'off') and Tc is the Toggle count. A dynamic power is the sum of internal power and net power, which is in proportional to "toggle count." The proportionality factor is a "weighting factor" for Tc. So, evaluating a weighted toggle count (WTC) is a desirable metric in circuit design because they are indicators of power consumption. Current circuit emulators compute WTC by software calculations that painstakingly track different toggling nets in the circuit design to accumulate all of weights of toggling nets on each clock cycle. If the time window includes many clock cycles, the software calculations may take hours (or even days) for large circuit designs that include hundreds of millions, or even billions of gates. Accordingly, WTC computation may be a major cause of delays and resource exhaustion in circuit design applications.

The description provided in the background section should not be assumed to be prior art merely because it is mentioned in or associated with the background section. The background section may include information that describes one or more aspects of the subject technology.

SUMMARY

In a first embodiment, a method is described that includes receiving a user-designed circuit layout including multiple modules in a hierarchical structure, selecting a first module in the hierarchical structure, generating the extra instrumental logic for the selected module and its sub modules to compute their WTC, merging these instrumental logic with the user-designed circuit to be downloaded to an emulator. The hardware-implemented method also includes iterating a netlist from an output to an input of the selected module, identifying a number of nets in the module that may toggle during a selected number of clock cycles, grouping all nets into multiple clusters (e.g., less than or about sixteen, or more clusters) based on the toggle weight factor for each net and finding an average weight factor for each cluster, and generating the instrumental logics to determine power consumption for each clock cycle. In some embodiments, the WTC of module (M) on clock cycle (C) is obtained by performing the following summation (where N is the total number of netlist clusters):

$$\sum_{i=1}^{N} \text{cluster\_average\_Weight}[i] * \text{number}$$

of toggling nets in cluster[$i$] on clock cycle C

The extra instrumental logic may output a real-time WTC for each running clock cycle during a circuit emulation, creating a waveform with the WTC values for further power analysis.

In a second embodiment, a system is described, the system including a memory, storing computer code, and at least one processor that executes the computer code. When the at least one processor executes the computer code, the system performs steps to receive a user-designed circuit layout including multiple modules in a hierarchical structure, select a first module in the hierarchical structure, generate the extra instrumental logic for the selected module and its sub modules to compute their WTC, merge these instrumental logics with the user-designed circuit to be downloaded to an emulator later. The at least one processor also executes computer code to iterate netlist from an output to an input of the selected module, identify a number of nets in the module that may toggle during a selected number of clock cycles, group all nets into multiple clusters e.g., less than or about sixteen, or more clusters) based on the toggle weight factor for each net and find an average weight factor for each cluster, and generate the instrumental logic to determine power consumption for each clock cycle.

In yet another embodiment, a non-transitory, machine-readable storage medium is described that includes machine-readable instructions for causing a processor to execute a method for receiving a user-designed circuit layout including multiple modules in a hierarchical structure, selecting a first module in the hierarchical structure, generating the extra instrumental logics for the selected module and its sub modules to compute their WTC, merging these instrumental logic with the user-designed circuit to be downloaded to an emulator later. The method also includes iterating netlist from an output to an input of the selected module, identifying a number of nets in the module that may toggle during a selected number of clock cycles, grouping all nets into multiple clusters (e.g., less than or about sixteen, or more clusters) based on the toggle weight factor for each net and finding an average weight factor for each cluster, generate the instrumental logic to determine power consumption for each clock cycle.

In a further embodiment, a system is described that includes a means for storing computer code and a means to execute the computer code to perform steps to receive a user-designed circuit layout including multiple modules in a hierarchical structure, select a first module in the hierarchical structure. The means to execute the computer code also executes computer code to iterate netlist from an output to an input of the selected module, identify a number of nets in the module that may toggle during a selected number of clock cycles, to group all nets into multiple clusters (e.g., less than or about sixteen, or more) based on the toggle weight factor for each net and find an average weight factor for each cluster. The means to execute computer code also executes computer code to generate the instrumental logic to determine power consumption for each clock cycle.

In a further embodiment, a method is described that includes identifying multiple power arcs in a memory block, each power arc comprising a source pin, a target pin, and a conditional pin. The hardware-implemented method also includes determining a distribution of power levels based on the power arcs, each power level associated with a power consumed by a read or write operation between a first address in the memory block coupled to the source pin and a second address in the memory block coupled to the target pin, and emulating, over a time window, a circuit that includes the memory block. The hardware-implemented method also includes identifying a number of power arcs within at least one cluster in the distribution of power levels that are activated during the time window, and determining a power consumption in the memory block based on the number of power arcs and on an average power level from the at least one cluster.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
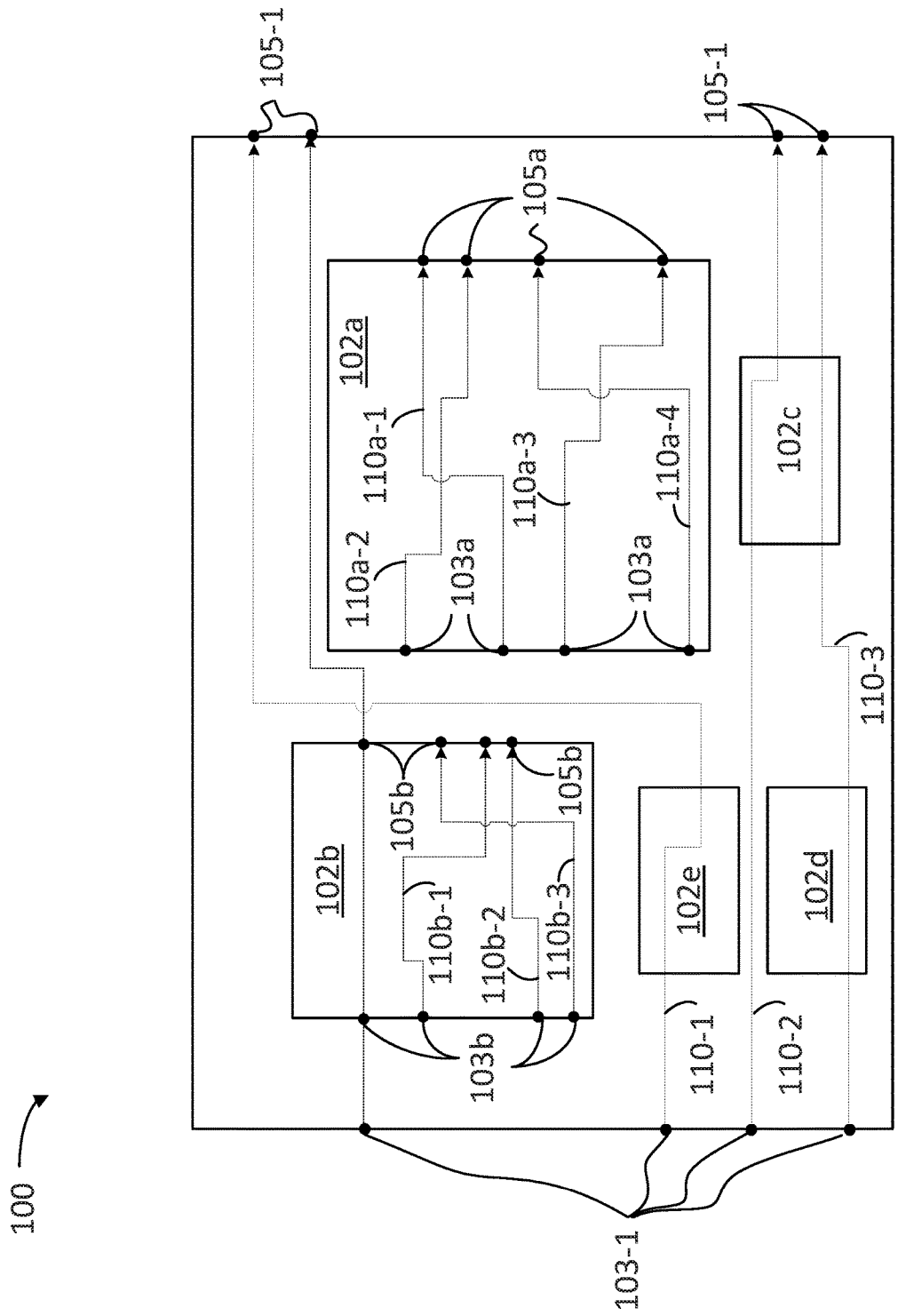
FIG. 1 illustrates a partial view of a circuit layout including multiple modules in a hierarchical structure, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

To evaluate the power consumption of any component (e.g., "module") in circuit design, embodiments as disclosed herein accumulate a number of toggling netlists in an instance for each clock cycle. The sum of weights of all toggling net is called WTC (Weighted Toggle Count). Further, embodiments as disclosed herein obtain a waveform of the WTC of the instance for multiple clock cycles in a circuit emulation. The WTC waveform is expected to trend in parallel with the real power consumption (cf. Eq. 1).

To obtain a more accurate assessment of the power consumption, embodiments as disclosed herein associate each netlist with a weight factor indicative of the power consumed when the netlist is toggling (e.g., activating/deactivating the different circuit components by the circuit netlist).

Embodiments as disclosed herein determine an accurate estimate of WTCs for evaluating power consumption of a selected hierarchy level in a circuit design. In some embodiments, a hardware-assisted WTC tool may be configured to compute a toggle number for every clock cycle in a desired hierarchy level. In some embodiments, the WTC indicates the toggle activity for multiple, or all, the netlists within the desired hierarchy level. A netlist is a signal path from an input port to an output port of a circuit or a module. Therefore, netlists include one or more circuit components in their trajectory, such as resistors, capacitors, transistors (e.g., complementary metal-oxide semiconducting—CMOS—transistors), inductors, coils, and the like. Each netlist is given a different weight because different netlists will contribute different power consumption when they toggle.

Complex circuit designs involve a multilevel hierarchy demanding analytic approaches that can adapt to the layered arrangement of performance features in each of the hierarchical levels. In embodiments as disclosed herein, WTC may indicate a weighted toggle count for specified design hierarchy level. More generally, in some embodiments a user may select different hierarchy levels to compute a WTC, as desired.

Embodiments as disclosed herein include an instrument logic tool to estimate a WTC (e.g., hardware-assisted WTC-HA-WTC-) rather than relying on exact computation of weight factors based on a software application. Thus, a hardware-assisted WTC can provide a real-time, accurate estimation of WTC for the circuit design by clustering weight factors for multiple netlists. Accordingly, while the HW-WTC result is an estimate of the WTC, the error may be reduced as desired by controlling a quality and depth of a clustering algorithm.

Embodiments as disclosed herein enable a real-time computation of WTC for large circuit designs including hundreds of millions, or even billions of gates (e.g., 500 million or more). Also, HW-WTC tools as disclosed herein may be implemented over time windows including millions of clock cycles (e.g., 100 million cycles or more). The HW-WTC tool emulates netlists in one or more hierarchy levels and obtains a WTC for each clock cycle in each netlist. When a netlist toggles at one cycle, then its corresponding weight factor is added to the WTC result for the one or more selected hierarchy levels. In some embodiments, the HW-WTC may keep multiple WTC results for multiple hierarchy levels.

The disclosed system addresses a technical problem tied to computer technology and arising in the realm of computer networks, namely the technical problem of determining power consumption of a circuit design, in real time. The disclosed system solves this problem by performing instrumental logic in the emulator tool for the circuit design. The instrumental logic replaces lengthy computations of exact weight factors for multiple netlists in a design with average values representative of netlist clusters.

Methods and systems as disclosed herein also include a separate approach to handle power consumption for memory blocks. Memory blocks have multiple memory cells handling bit strings associated with address pins and with data pins. Power consumption for most address pins is similar. Likewise, power consumption for most data pins is similar. When one memory cell is instantiated multiple times in a design, embodiments as disclosed herein includes instrumental logic to cluster address bits together, and to cluster data bits together.

FIG. 1 illustrates a partial view of a circuit layout 100 including multiple modules 102*a*, 102*b*, 102*c*, 102*d*, and 102*e* (hereinafter, collectively referred to as "modules 102"), in a hierarchical structure, according to some embodiments. The hierarchical structure in circuit layout 100 may be determined based on the relative size of modules 102. For example, a top hierarchical level may include all of modules 102. Modules 102*a* and 102*b* are larger than 102*c*, 102*d*, and 102. Accordingly, a first sub-level ("top A") may include module 102*a* only, and a second sub-level ("top B") may include module 102*b*, only.

Circuit layout 100 also includes, at the top hierarchical level, input ports 103-1, and output ports 105-1, coupled by netlists 110-1, 110-2, and 110-3. Some of the netlists at the top hierarchical level may include components in the smaller modules 102*c*, 102*d* and 102*e*. For example, netlist 110-1 includes components in module 102*e*, netlist 110-2 and 110-3 include components in module 102*c*. Further, netlist 110-3 may also include components in module 102*d*. At the top A hierarchical level, module 102*a* includes input ports 102*a* coupled to output ports 105*a* via netlists 110*a*-1, 110*a*-2, 110*a*-3, and 110*a*-4 (hereinafter, collectively referred to as "netlists 110*a*"). Further, at the top B hierarchical level, module 102*b* includes input ports 103*b* coupled to output ports 105*b* via netlists 110*b*-1, 110*b*-2, and 110*b*-3 (hereinafter, collectively referred to as "netlists 110*b*"). Input ports 103-1, 103*a*, and 103*b* will be collectively referred, hereinafter, as "input ports 103." Output ports 105-1, 105*a* and 105*b* will be collectively referred to, hereinafter, as "output ports 105." Likewise, netlists 110-1, 110-2, 110-3, 110*a* and 110*b* will be collectively referred to, hereinafter, as "netlists 110."

In some embodiments, the netlists in circuit layout 100 are selected such that at least one of netlists 110-1, 110-2 or 110-3 includes a component in at least one of modules 102*c*, 102*d*, and 102*e*. Moreover, in some embodiments netlists 110-1, 110-2 and 110-3 are selected to include at least one circuit component outside of modules 102*a* or 102*b*. In some embodiments, a netlist 110-4 may include at least one circuit component inside module 102*a* or inside module 102*b* (or inside modules 102*a* and 102*b*). Accordingly, netlists 110-4 may be included in the top hierarchical level, and its associated toggle count may be increased only when no local toggle within either of modules 102*a* or 102*b* is detected, for that netlist.

Embodiments as disclosed herein include a hardware assisted WTC computation by instrumental logic embedded in the emulator of circuit layout 100. The instrumental logic includes a grouping of netlists 110 according to the different hierarchical levels (e.g., top A, top B, and top), and according to a weight factor. Average weight factors are determined from the grouping of the netlists for each hierarchy level, and are merged to a compiled register transfer level (RTL) code, executed by the emulator. Accordingly, the emulator hardware evaluates the WTC in real time, as each of the modules in the top A, top B, and top hierarchies evolves and toggles through multiple clock cycles. Accordingly, a designer using an emulator configured to perform methods as disclosed herein may retrieve WTC results while the design is running in the emulator. This is a desirable feature, as the designer may identify time windows that may seem problematic or that indicate a sudden increase in toggle count rate (as measured against the number of clock cycles).

Figure 2:
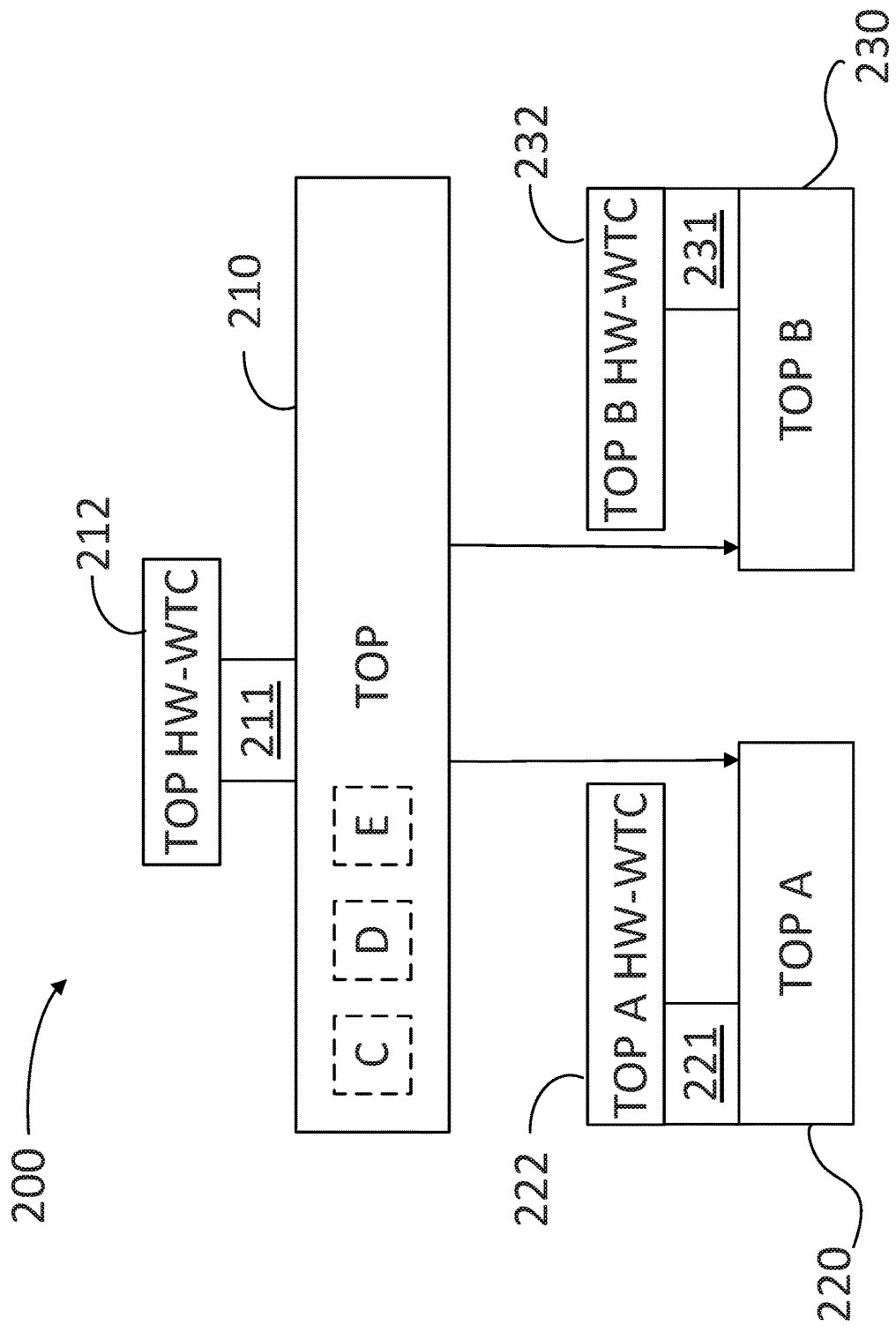
FIG. 2 illustrates a hardware assisted weighted toggle count for multiple hierarchy levels in a circuit design, according to some embodiments.

FIG. 2 illustrates a hardware assisted weighted toggle count for multiple hierarchy levels in a circuit design 200, according to some embodiments. For illustrative purposes only, and without limitation, circuit design 200 may be as circuit 100 including a top level 210 (including smaller modules C, D and E), a top A level 220 (including a larger module A), and a top B level 230 (including a larger module B). A top HW-WTC compiled code 212 merging instrument logic with HDL code for top level 210 provides toggle count 211, including toggles of output ports in each of modules C, D and E, in addition to toggles for signals over different netlists in top level 210. A top A HW-WTC compiled code 222 merging instrument logic with HDL code for top A level 220 provides toggle count 221. And a top B HW-WTC compiled code 232 merging instrument logic with HDL code for top B level 230 provides a toggle count 231. A toggle count for each of small modules C, D and E is included in toggle count 211 for top level 210.

In some embodiments, toggle counts 211, 221, and 222 are determined and maintained in memory, separately. Moreover, in some embodiments toggle count 211 may include the sum of toggle count 221 and toggle count 222. More generally, the WTC for each design hierarchy level (e.g., top 210) may be the sum of the WTC for all of its child instances (e.g., top A 220 and top B 230).

Figure 3:
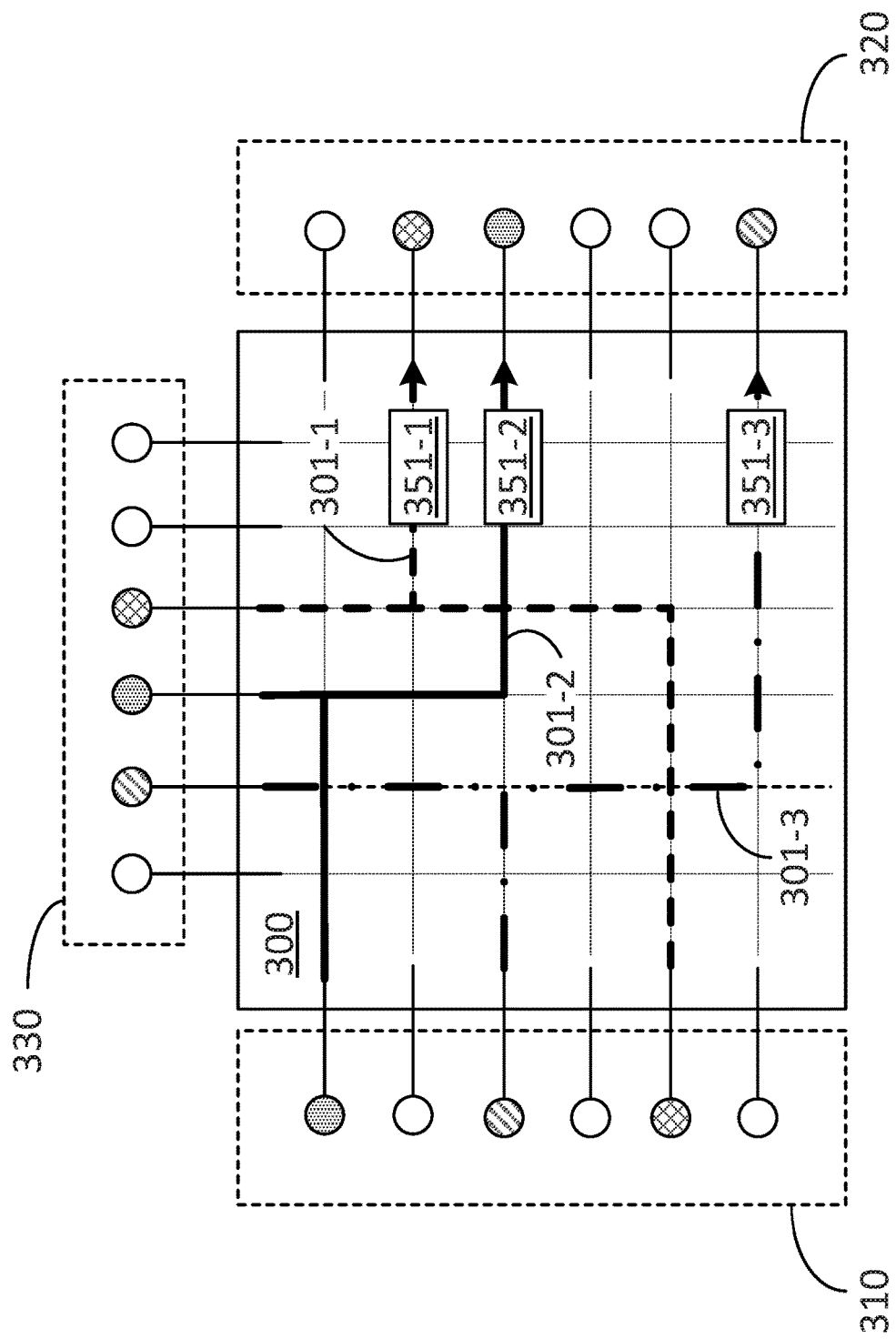
FIG. 3 illustrates a partial view of multiple power arcs in a memory block, according to some embodiments.

FIG. 3 illustrates a partial view of power arcs 301-1, 301-2, and 301-3 (hereinafter, collectively referred to as "power arcs 301") in a memory block 300, according to some embodiments. Power arcs 301 describe the trajectory of a power signal for a read/write command to memory block 300 from one of multiple source pins ("from" pins) 310 to one of target pins ("to" pins) 320. The power consumption of memory block 300 is determined by power arcs 301. Source pins 310 include the address in memory block 300 of a memory cell from which data is read. Target pins 330 include the address of a register in memory block 300 or elsewhere in the circuit design where the data is written to, in a read/write command directed to memory block 300. Power arcs 301 also include one of multiple conditional pins 330 (e.g., "when") that enable the read/write action described by power arcs 301.

In some embodiments, a system for hardware enabled toggle count as disclosed herein may include a memory-specific file (e.g., a "*.lib" file) configured to emulate the operation of memory block 300. The memory-specific file contains power arcs 301 and code to address semantics as to: when source pin 310 and target pin 320 toggle, and conditional pin 330 is true, then the power consumption is increased by a power number 351-1, 351-2 or 351-3 (hereinafter, collectively referred to as "power numbers 351"), specified for each power arc. Accordingly, embodiments as disclosed herein include instrument logic to evaluate power for memory block 300, based on the semantics for each of power arcs 301.

Figure 4:
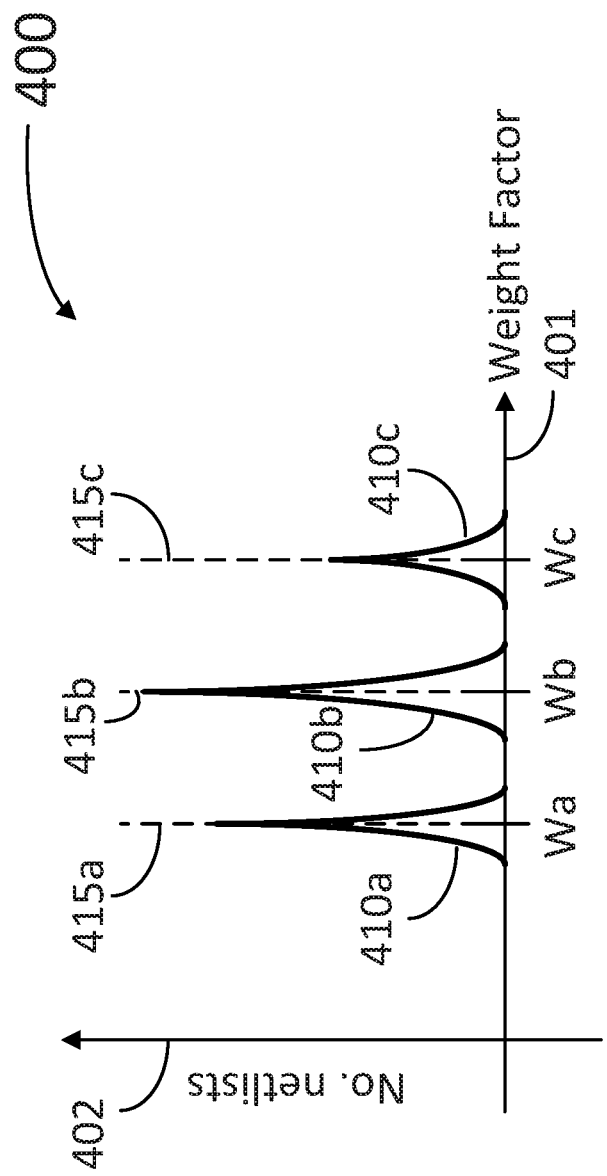
FIG. 4 illustrates a distribution of weight factors for multiple netlists in a module, according to some embodiments.

FIG. 4 illustrates a distribution 400 of weight factors 401 for multiple netlists 402 in a module, according to some embodiments. Distribution 400 may be created by an analyzer tool based on a code for the emulation of the circuit design. The code may be created in a hardware description language (HDL), and may include a description of the different netlists in the module. Distribution 400 may be separated in clusters 410a, 410b, and 410c (hereinafter, collectively referred to as "clusters 410"). Each of clusters 410 may have an average value 415a (Wa), 415b (Wb), and 415c (Wc, hereinafter, collectively referred to as "average values 415"), respectively.

An HW-WTC tool as disclosed herein uses average values 415 to assign weight factors for each netlist. Further, the HW-WTC tool is configured to calculate a netlist WTC as:

$$\text{Netlist } WTC = W_1 * TC_1 + W_2 * TC_2 + \ldots + W_N * TC_N \quad (2)$$

wherein Wi is the average weight for cluster "i" (e.g., average values 415) and TCi is number of toggling netlists in cluster "i" where "i" is an integer value running from 1 to an integer, N, indicative of the total number of clusters (e.g., up to sixteen, or even more).

Figure 5:
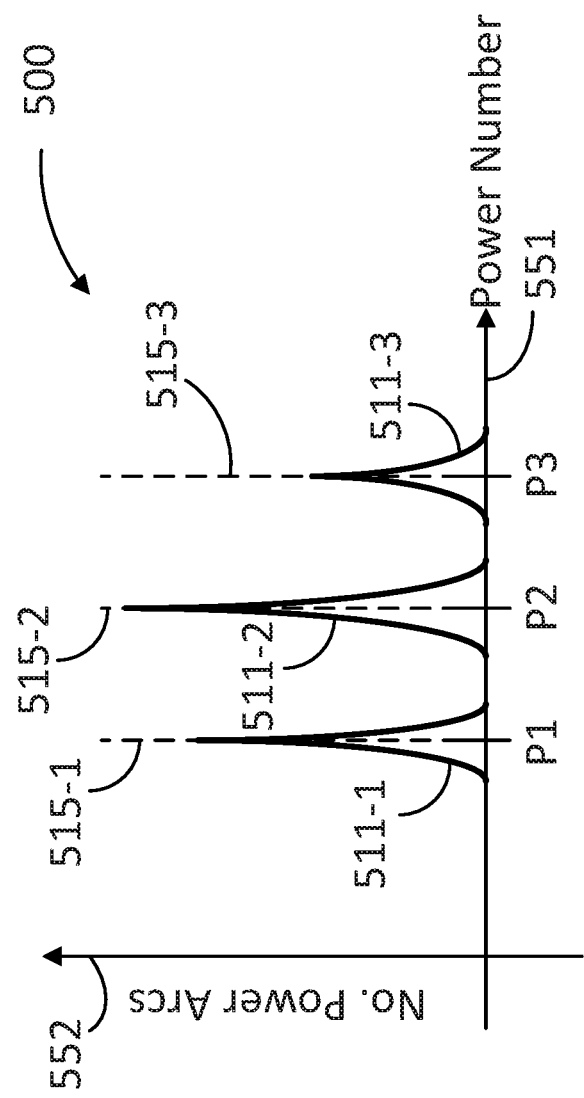
FIG. 5 illustrates a distribution of power numbers for multiple power arcs in a module, according to some embodiments.

FIG. 5 illustrates a distribution 550 of power numbers 551 for multiple power arcs in a module (e.g., power arcs 501 in memory block 500), according to some embodiments. Distribution 550 indicates a number of power arcs 552 having power number 551. Systems and tools consistent with the present disclosure are configured to form a distribution of power arcs 501 according to power numbers 551. In some embodiments, a clustering tool is configured to identify multiple clusters 511-1, 511-2, and 511-3 (hereinafter, collectively referred to as "clusters 511") based on power number 551 for each power arc. Clusters 511 include multiple power arcs having similar power number 551, and an average power number 515-1, 515-2, and 515-3 (hereinafter, collectively referred to as "average power numbers 515") for each cluster. An emulator tool verifies, in real time, the number of power arcs that are active in the cluster. In some embodiments, the emulator tool is configured to identify that a power arc is active when a source pin and a target pin toggle, and a conditional pin is true (e.g., source pins 510, target pins 520, and conditional pins 530). When such conditions are detected, the emulator tool multiplies the number of active power arcs with the average power number 515 for the cluster to which the active power arcs belong. Accordingly, the emulator tool may be configured to perform the following mathematical computation.

$$WTC\_\text{result\_power\_arc} = P_1 * A_1 + P_2 * A_2 + \ldots + P_M * A_M \quad (3)$$

Where $A_i$ is the number of active power arcs determined by the emulator tool, $P_i$ is average power number 515 for a cluster 511-$i$, and "i" is an integer number. In some embodiments, the sum in Eq. 2 is performed for i=1 to M, where M is the total number of clusters 511 found by the clustering tool in the memory block.

Figure 6:
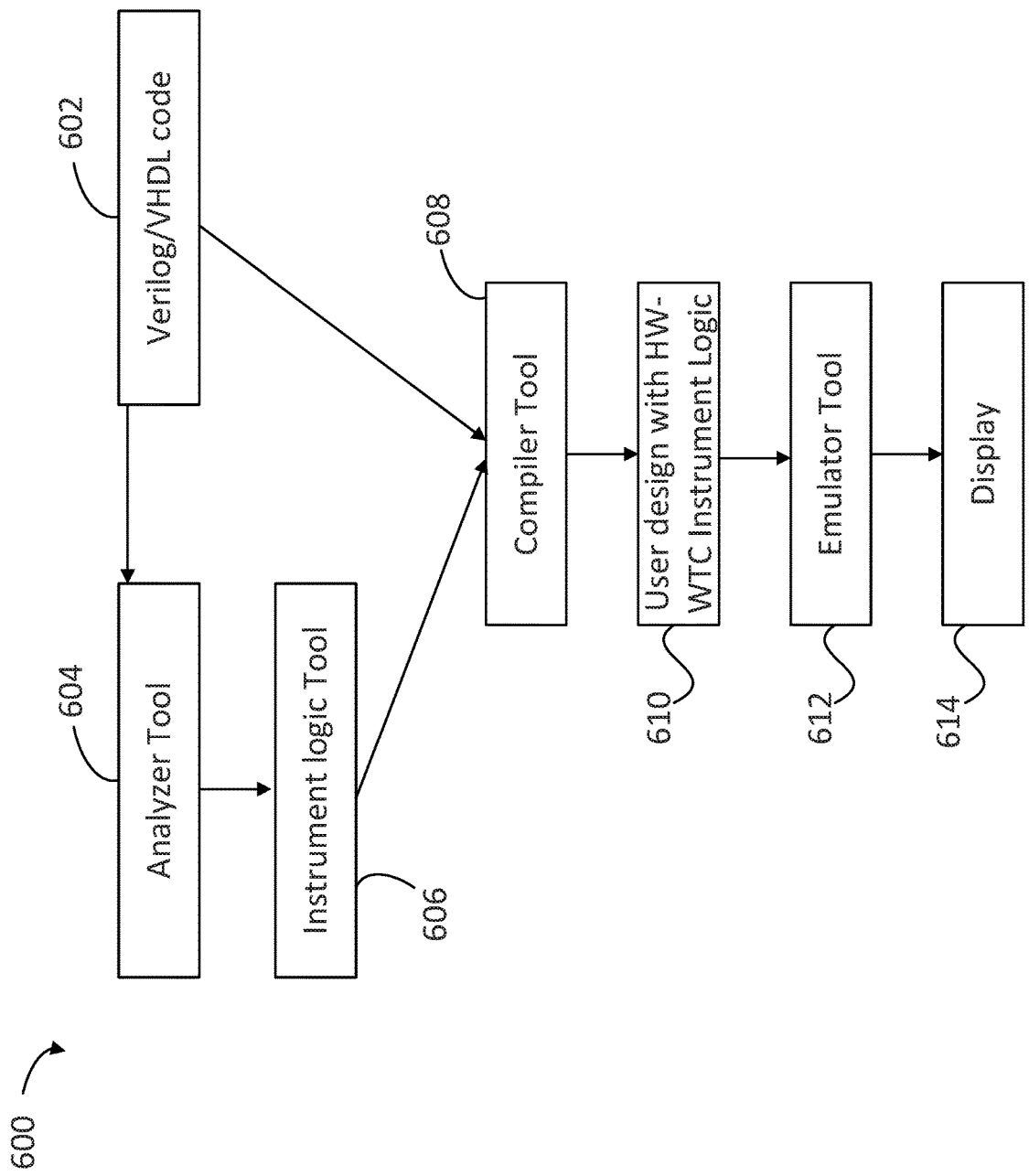
FIG. 6 is a block diagram illustrating a system for hardware-enabled weighted toggle count, according to some embodiments.

FIG. 6 is a block diagram illustrating a system 600 for hardware enabled WTC, according to some embodiments. An HDL tool 602 (e.g., Verilog/VHDL code) provides an RTL code to analyzer tool 604. In some embodiments, HDL tool 602 inspects a circuit design to determine a weight for all, or at least some of the netlists in the circuit design. Further, HDL tool 602 may be configured to retrieve power arc information for all, or at least some of memory instances in the circuit. In some embodiments, HDL tool 602 may include RTL instructions to automatically detect a peak on a WTC result. Further, HDL tool 602 may be configured to capture a time window around a detected peak, for further inspection. This feature enables a user to quickly address problematic points in the circuit design that may be causing power surges, and to ascertain the conditions and causes for these power surges.

Analyzer tool 604 generates code to compute the hardware-assisted WTC to form instrument logic tool 606. In some embodiments, instrument logic tool 606 is configured to determine weight for the netlists in the circuit design. In some embodiments, instrument logic tool 606 is configured to determine power arcs for memory blocks in the circuit design. In some embodiments, instrument logic tool 606 is configured to incorporate multiple design hierarchy levels in the circuit analysis. In some embodiments, instrument logic tool 606 is configured to receive form the user a selected design hierarchy level, or a selected module, or a selected memory block, to obtain a specific WTC result for the selection.

In some embodiments, instrument logic tool 606 is configured to create separate instrumental logic for each large child instances of a netlist in a design hierarchy. Further, in some embodiments, instrument logic tool 606 is configured to create a single instrumental logic for multiple small child instances in a design hierarchy. Also, in some embodiments instrument logic tool 606 is configured to sum the different contributions from the large child instances and the multiple small child instances, to obtain a WTC result for a desired hierarchy level. In some embodiments, instrument logic tool 606 provides HDL code to compiler tool 608. Compiler tool 608 compiles the HDL code into executable code 610 that merges the user design with instrument logic in a hardware assisted WTC. Executable code 610 is provided to emulator tool 612 to emulate the operation of the circuit in the circuit layout.

In some embodiments, emulator tool 612 is configured to determine a WTC result for a circuit as a direct sum of a WTC value related to netlists in one or more modules (cf.

Eq. 1) and a WTC value related to power arcs in one or more memory blocks (cf. Eq. 2). The one or more modules and the one or more memory blocks may share a specified hierarchy level in the circuit design. Further, in some embodiments emulator tool 612 is configured to provide, to a display 614, multiple waveforms indicative of toggle counts for different netlists, or power waveforms indicative of the WTC value for each netlist over a selected time window (e.g., curves 421 and 521). In some embodiments, emulator tool 612 provides data to display 614, in real time.

Figure 7:
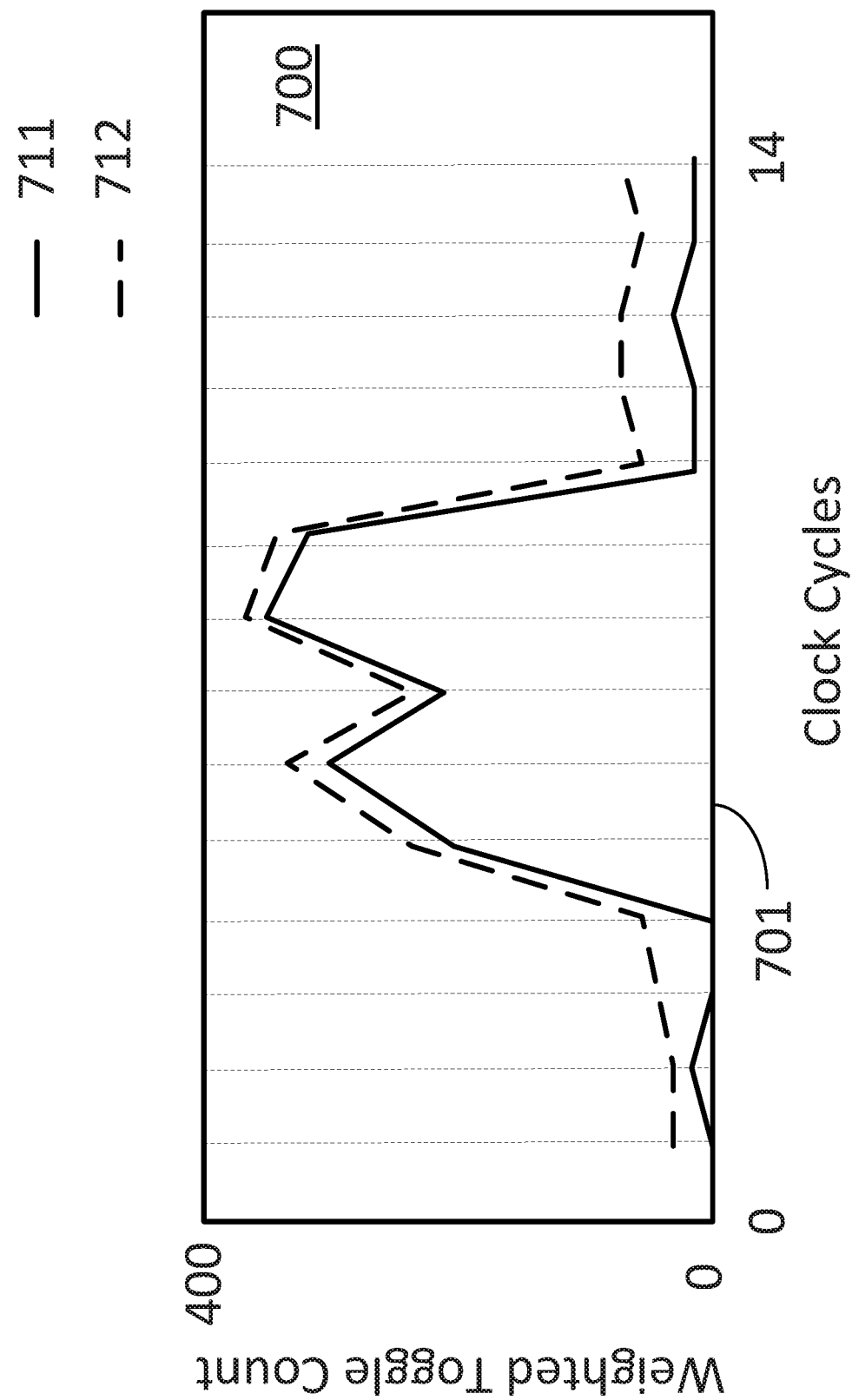
FIG. 7 is a chart illustrating a waveform indicative of power consumption of a circuit over a time window obtained with an emulator tool, according to some embodiments.

FIG. 7 is a chart 700 illustrating waveforms 711 and 712 indicative of power consumption of a circuit over a time window obtained with an emulator tool (e.g., emulator tool 612), according to some embodiments. Chart 700 illustrates a number of clock cycles 701 in the ordinates, and a WTC 750 calculated over all netlists in a selected circuit hierarchy, for each clock cycle. Curve 711 includes a HW-WTC performed with a circuit emulator tool according to embodiments disclosed herein (cf. Eq. 2). Curve 712 illustrates a WTC calculation performed in a software-based approach, wherein for each clock cycle a full simulation is performed to determine the exact toggle weight for each netlist in the given circuit hierarchy. It is seen that, while the HW-WTC approach 711 deviates slightly from the more accurate software simulation 7122, the similarity between the results in curve 711 and curve 712 is remarkable, especially taking into account that the HW-WTC method is much faster than the software assisted method.

Chart 700 illustrates that between clock cycles 5-11, a large peak of toggling activity is identified for the circuit. When a user detects an activity such as illustrated in curve 711, it may be desirable to figure out what is causing the excessive power usage in the circuit. Accordingly, a user may re-run the HW-WTC routine to attempt to identify a portion in the code that is introducing the power consumption violation, and a specific circumstance when this may occur.

Figure 8:
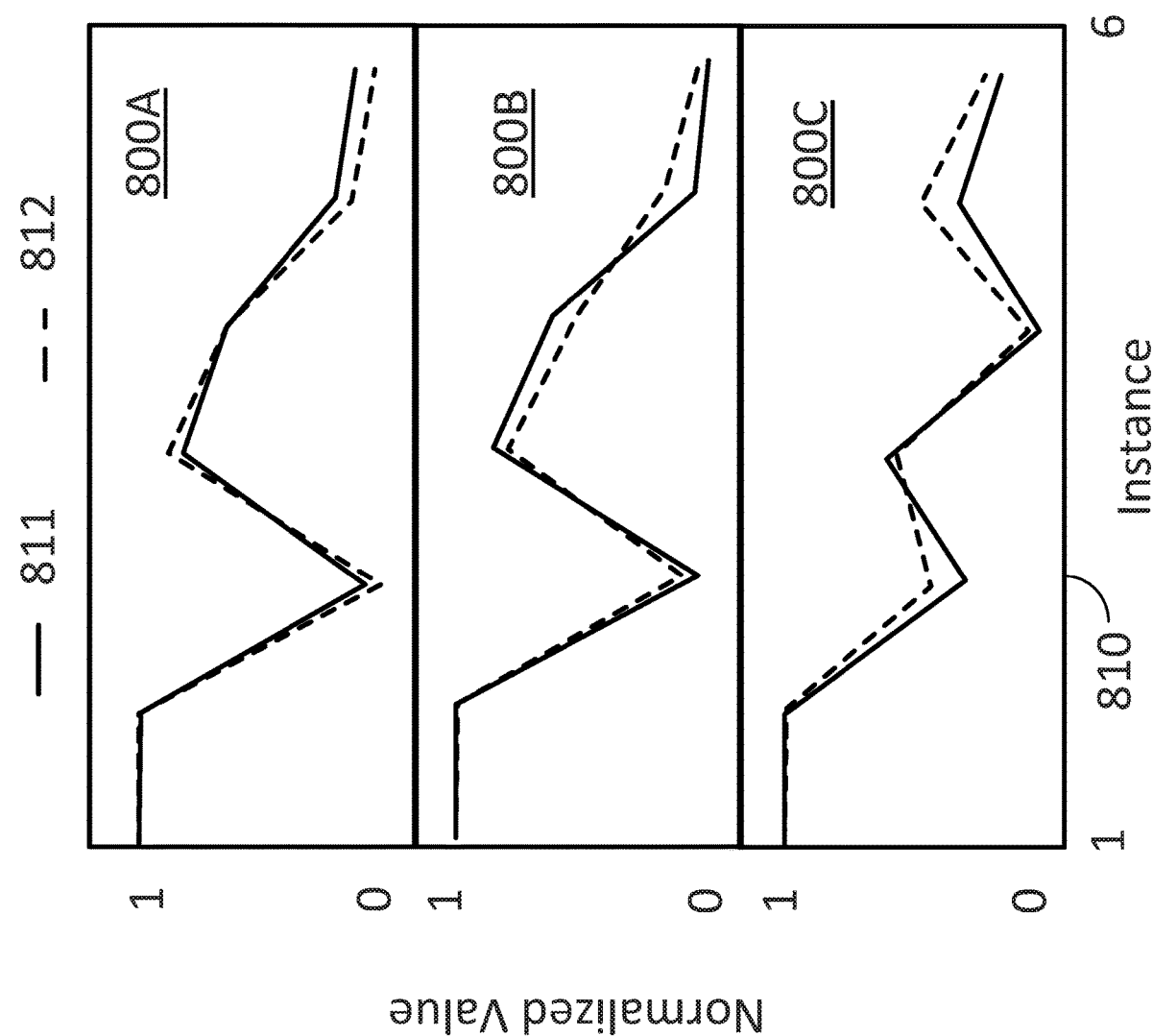
FIGS. 8A-C illustrate a comparison of hardware based and a software based weighted toggle count for multiple instances of a circuit netlist in an emulator tool, according to some embodiments.

FIGS. 8A-C illustrate a comparison of hardware based HW-WTC results 811 and a software based WTC result 812 for multiple instances 810 of a circuit netlist in an emulator tool, according to some embodiments. The instance value is reflected along the abscissae (X-axis), and the normalized WTC values are reflected along the ordinates (Y-axis). HW-WTC results 811 and software simulation results 812 are normalized values from 0 to 1 (e.g., where the instances 810 have been sorted from 1 to 6 according to WTC value).

Chart 800A illustrates a normalized value of the maximum WTC for the given instance. Chart 800B illustrates a normalized value of the average WTC for the given instance. And chart 800C illustrates a normalized value for maximum WTC for the given instance. Charts 800A, 800B and 800C are collectively referred to, hereinafter, as "charts 800." Charts 800 indicate that while the HW-WTC results 811 differs slightly from the exact simulation 812, the values are in fact quite close, for all the different instances. In addition, the much faster determination of HW-WTC results 811 makes it highly desirable in embodiments where real-time, or quasi real-time results are critical for circuit design and test.

Figure 9:
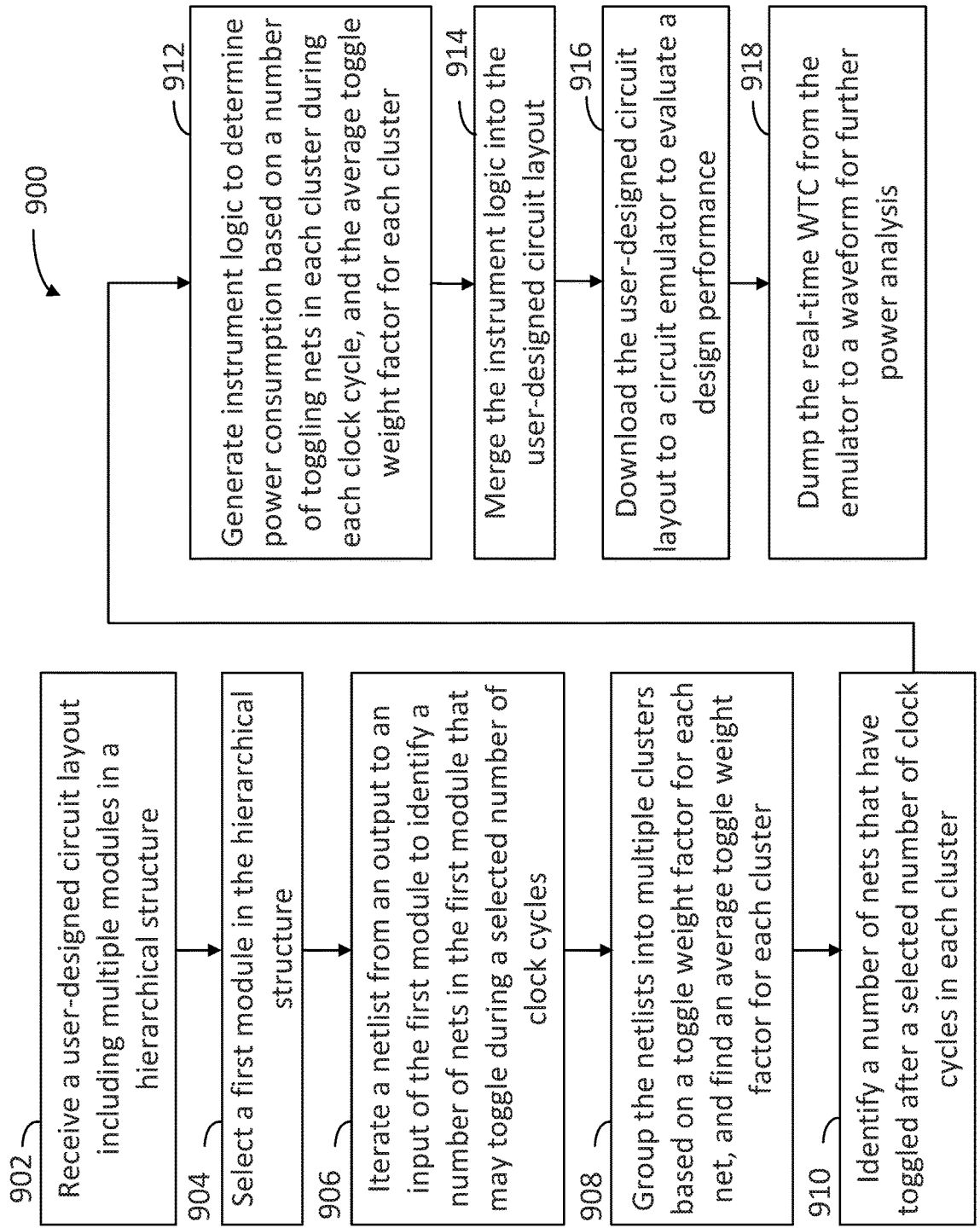
FIG. 9 is a flowchart including steps in a method for determining a power consumption in a circuit using instrumental logic in an emulator tool, according to some embodiments.

FIG. 9 is a flowchart including steps in a method 900 for determining a power consumption in a circuit using instrumental logic in an emulator tool, according to some embodiments. Method 900 may be performed at least partially by a system for hardware enabled weighted toggle count (e.g., system 600). At least some of the steps in method 900 may be performed by an analyzer tool, a compiler tool, or an emulator tool (e.g., analyzer tool 604, compiler tool 608, and emulator tool 612). In some embodiments, the emulator tool may include a field-programmable gate array configured to execute an RTL code provided by the compiler tool. Methods consistent with the present disclosure may include at least some, but not all, of the steps illustrated in method 900, performed in a different sequence. Furthermore, methods consistent with the present disclosure may include at least two or more steps as in method 900 performed overlapping in time, or almost simultaneously.

Step 902 includes receiving a user-designed circuit layout including multiple modules in a hierarchical structure.

Step 904 includes selecting a first module in the hierarchical structure. In some embodiments, step 904 includes selecting a second module in a same hierarchical level as the first module, determining a second weighted toggle count for the second module, and determining a power consumption of the same hierarchical level based on the first weighted toggle count and on the second weighted toggle count.

Step 906 includes iterating at least one netlist from an output to an input of the first module to identify a number of netlists in the first module that may toggle during a selected number of clock cycles.

Step 908 includes grouping the netlists into multiple clusters based on a toggle weight factor for each netlist and finding an average toggle weight factor for each cluster. In some embodiments, the number of clusters selected in step 908 is about sixteen (16), or less. In some embodiments, step 908 includes compiling the circuit layout into a register transfer level executable code, and identifying a power consumption from each of the netlists comprises executing the register transfer level executable code for multiple clock cycles.

Step 910 includes identifying a number of netlists that have toggled after a selected number of clock cycles in each cluster. In some embodiments, step 910 includes determining a first weighted toggle count for the first module based on the average weight factor and the number of netlists that have toggled. In some embodiments, step 910 includes identifying a second hierarchical level that comprises the first module and at least a second module smaller than the first module and grouping the netlists in the second hierarchical level, wherein the netlists include at least a circuit component in the second module. Further, in some embodiments, step 910 includes determining a weighted toggle count for the second hierarchical level based on a weighted toggle count for the netlists in the second hierarchical level, wherein determining the power consumption comprises adding the weighted toggle count for the first module and the weighted toggle count for the second hierarchical level.

Step 912 includes generating instrument logic to determine a power consumption based on a number of toggling netlists in each cluster during each clock cycle, and based on the average toggle weight factor for each cluster (cf. Eq. 2). In some embodiments, step 912 includes determining a power consumption based on the first weighted toggle count for the first module. In some embodiments, step 912 includes detecting a peak in the first weighted toggle count and capturing a time window of a circuit emulation that comprises the peak. In some embodiments, the first module is a memory block, and at least one of the netlists is a power arc comprising a source pin, a target pin, and a conditional pin. Accordingly, step 912 may include determining a power consumption based on an average power for the cluster and a number of times that the power arc is activated within a window comprising multiple clock cycles.

Step 914 includes merging the instrument logic into the user-designed circuit layout. In some embodiments, step 914 includes creating, with a compiler tool, an executable code for the emulator tool.

Step 916 includes downloading the user-designed circuit layout (including the merged instrument logic) to a circuit emulator to evaluate a design performance of the circuit layout.

Step 918 includes modifying the circuit layout when the power consumption exceeds a pre-selected threshold. In some embodiments, step 918 may include identifying a peak in a waveform (e.g., waveform 711) presented in real time during a circuit emulation, wherein a WTC exceeds the pre-selected threshold (e.g., 100, 200, 300, or 400 WTCs during a clock cycle). Moreover, in some embodiments the pre-selected threshold in step 918 includes an aggregated WTC over a selected time window including one or more clock cycles.

Figure 10:
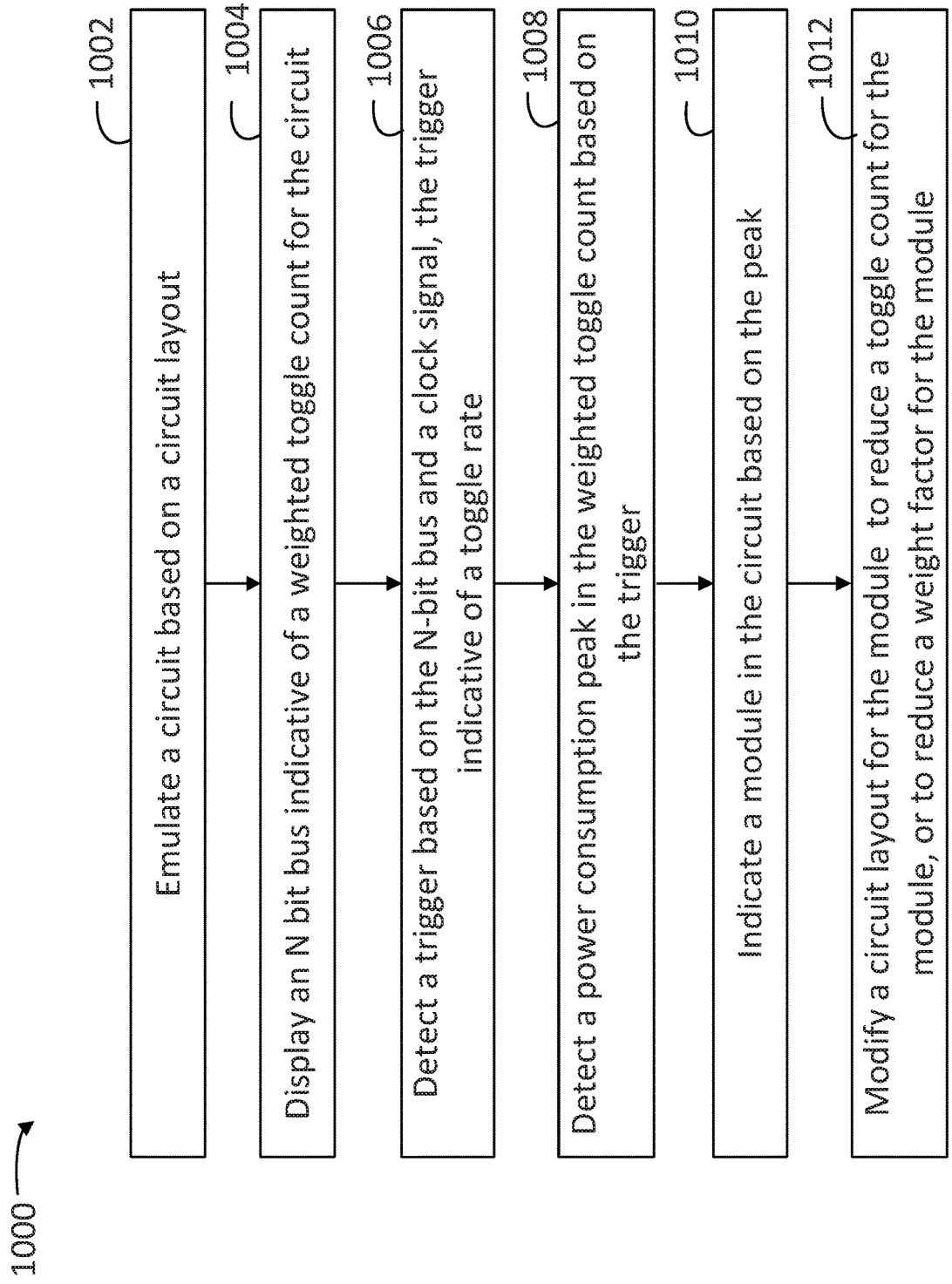
FIG. 10 is a flowchart including steps in a method for modifying a circuit layout to reduce a toggle count for the circuit, according to some embodiments.

FIG. 10 is a flowchart including steps in a method 1000 for modifying a circuit layout to reduce a toggle count for the circuit, according to some embodiments. Method 1000 may be performed at least partially by a system for hardware enabled weighted toggle count (e.g., system 600). At least some of the steps in method 1000 may be performed by an analyzer tool, a compiler tool, or an emulator tool (e.g., analyzer tool 604, compiler tool 608, and emulator tool 612). In some embodiments, the emulator tool may include a field-programmable gate array configured to execute an RTL code provided by the compiler tool. Methods consistent with the present disclosure may include at least some, but not all, of the steps illustrated in method 1000, performed in a different sequence. Furthermore, methods consistent with the present disclosure may include at least two or more steps as in method 1000 performed overlapping in time, or almost simultaneously.

Step 1002 includes emulating a circuit based on a circuit layout.

Step 1004 includes displaying an N-bit bus indicative of a weighted toggle count for the circuit.

Step 1006 includes detecting a trigger based on the N-bit bus and a clock signal, the trigger indicative of a toggle rate Step 1008 includes detecting a power consumption peak in the weighted toggle count based on the trigger.

Step 1010 includes indicating a module in the circuit based on the peak.

Step 1012 includes modifying a circuit layout for the module to reduce a toggle count for the module, or to reduce a weight factor for the module.

Figure 11:
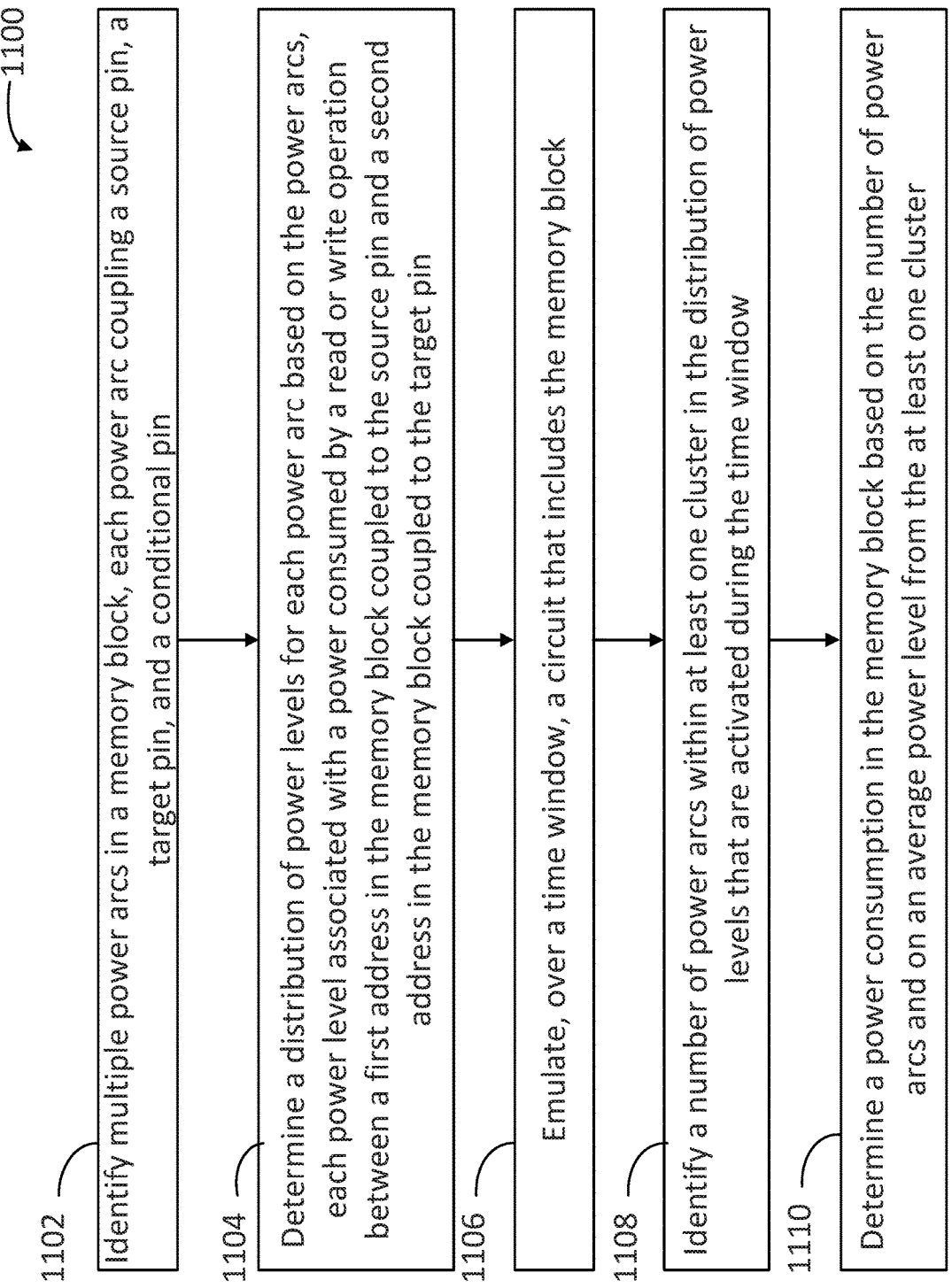
FIG. 11 is a flow chart including steps in a method for determining a power consumption in a memory block using instrumental logic in an emulator tool, according to some embodiments.

FIG. 11 is a flowchart including steps in a method 1100 for determining a power consumption in a memory block using instrumental logic in an emulator tool, according to some embodiments. Method 1100 may be performed at least partially by a system for hardware enabled weighted toggle count (e.g., system 600). At least some of the steps in method 1100 may be performed by an analyzer tool, a compiler tool, or an emulator tool (e.g., analyzer tool 604, compiler tool 608, and emulator tool 612). In some embodiments, the emulator tool may include a field-programmable gate array configured to execute an RTL code provided by the compiler tool. Methods consistent with the present disclosure may include at least some, but not all, of the steps illustrated in method 1100, performed in a different sequence. Furthermore, methods consistent with the present disclosure may include at least two or more steps as in method 1100 performed overlapping in time, or almost simultaneously.

Step 1102 includes identifying multiple power arcs in a memory block, each power arc including a source pin, a target pin, and a conditional pin.

Step 1104 includes determining a distribution of power levels based on the power arcs, each power level associated with a power consumed by a read or write operation between a first address in the memory block coupled to the source pin and a second address in the memory block coupled to the target pin.

Step 1106 includes emulating, over a time window, a circuit that includes the memory block.

Step 1108 includes identifying a number of power arcs within at least one cluster in the distribution of power levels that are activated during the time window.

Step 1110 includes determining a power consumption in the memory block based on the number of power arcs and on an average power level from the at least one cluster. In some embodiments, step 1110 includes adding the product of a number of active power arcs in a cluster with the average power level for each of the clusters (cf. Eq. 3).

Figure 12:
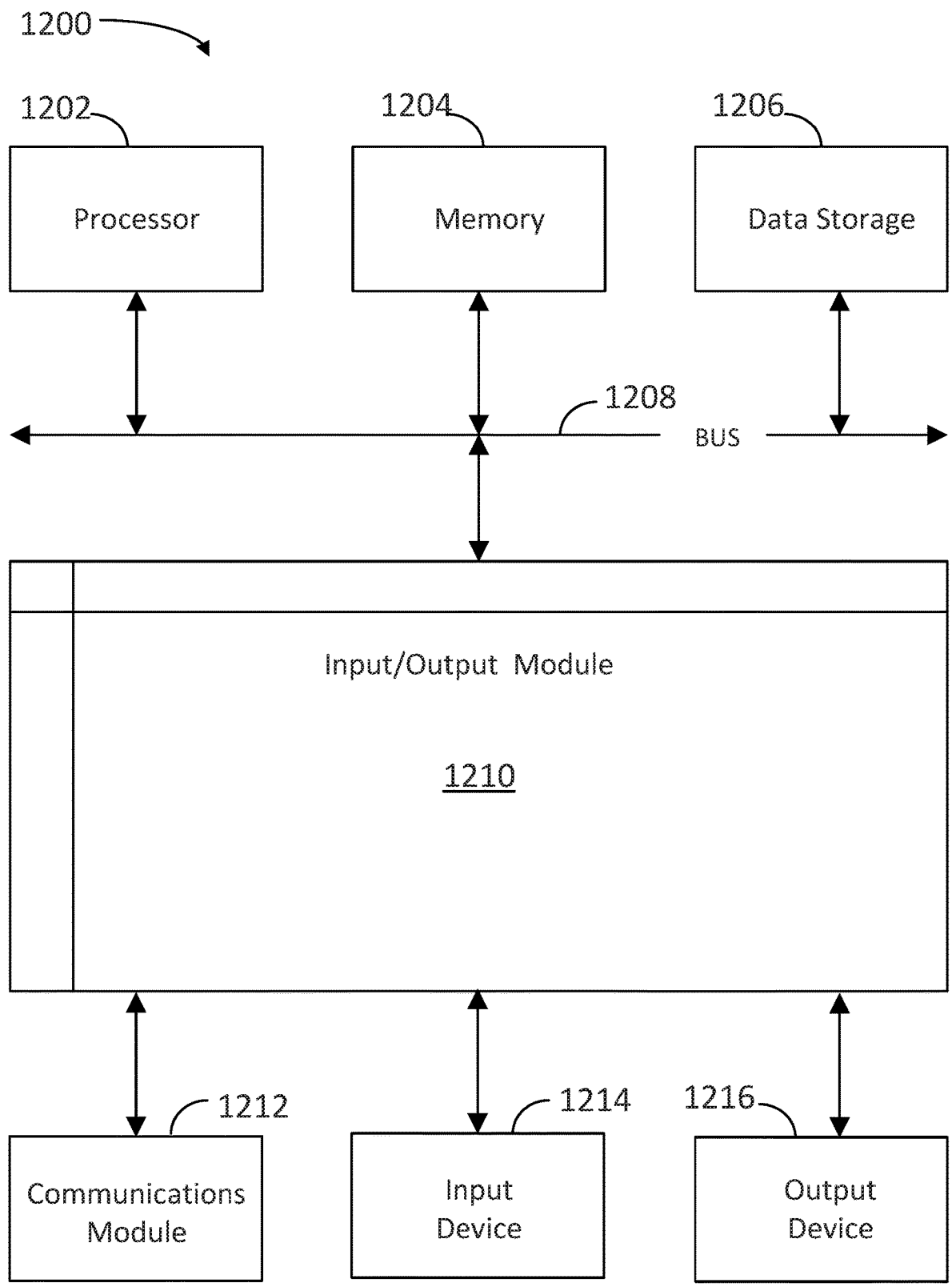
FIG. 12 is a block diagram illustrating an example computer system that includes a design tool, according to some embodiments.

FIG. 12 is a block diagram illustrating an example computer system 1200 with which the methods, steps and systems illustrated in FIGS. 6-11 can be implemented, according to some embodiments. In certain aspects, computer system 1200 can be implemented using hardware or a combination of software and hardware, either in a dedicated server, integrated into another entity, or distributed across multiple entities.

Computer system 1200 includes a bus 1208 or other communication mechanism for communicating information, and a processor 1202 coupled with bus 1208 for processing information. By way of example, computer system 1200 can be implemented with one or more processors 1202. Processor 1202 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1202 may include modules and circuits configured as a 'placing' tool or engine, or a 'routing' tool or engine, to place devices and route channels in a circuit layout, respectively and as disclosed herein.

Computer system 1200 includes, in addition to hardware, code that creates an execution environment for the computer program in question, e.g., code that constitutes processor firmware, a protocol stack, a database management system, an operating system, or a combination of one or more of them stored in an included memory X04, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. Processor 1202 and memory 1204 can be supplemented by, or incorporated in, special purpose logic circuitry.

The instructions may be stored in memory 1204 and implemented in one or more computer program products, e.g., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NETLIST), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions.

Computer system 1200 is coupled via input/output module 1210 to various devices. The input/output module 1210 is any input/output module. Example input/output modules 1210 include data ports such as USB ports. The input/output module 1210 is configured to connect to a communications module 1212. Example communications modules 1212 include networking interface cards, such as Ethernet cards and modems. In certain aspects, the input/output module 1210 is configured to connect to a plurality of devices, such as an input device 1214 and/or an output device 1216. Example input devices 1214 include a keyboard and a pointing device, e.g., a mouse or a trackball, by which a user can provide input to the computer system 1200. Other kinds of input devices 1214 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1216 include display devices, such as a LED (light emitting diode), CRT (cathode ray tube), or LCD (liquid crystal display) screen, for displaying information to the user.

Methods as disclosed herein may be performed by computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein (e.g., as in methods 600-800). One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., communication network 150. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 1200 includes servers and personal computer devices. A personal computing device and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1202 for execution. Such a medium may take many forms, including, but not limited to, non-volatile media, volatile media, and transmission media. Non-volatile media include, for example, optical disks, magnetic disks, or flash memory, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
   selecting a first module of a circuit layout;
   identifying multiple netlists that toggle in the first module during a number of clock cycles;
   grouping the netlists that toggle into multiple clusters based on a toggle weight factor for each netlist of the netlists that toggle;
   generating instrument logic for determining power consumption of the circuit layout based on a at least a number of netlists that toggle in each cluster and a representative toggle weight factor for each cluster of the multiple clusters;
   merging, with a compiler tool, the instrument logic with the circuit layout into an executable file for an emulator tool; and
   evaluating the power consumption of the circuit layout with the emulator tool.

2. The method of claim 1, wherein grouping the netlists that toggle into multiple clusters comprises compiling the circuit layout into register transfer level executable code, and determining power consumption for the circuit layout comprises executing the register transfer level executable code.

3. The method of claim 1, wherein evaluating a power consumption of the circuit layout comprises detecting a peak power consumption and capturing a time window of a circuit emulation that corresponds to the peak power consumption.

4. The method of claim 1, further comprises selecting a second module of the circuit layout in a same hierarchical level of the circuit layout as the first module, and determining a power consumption of the same hierarchical level of the circuit layout based on at least the number of netlists that toggle in each cluster of the first module and a representative toggle weight factor for each cluster of the multiple clusters of the first module, and a number of netlists that toggle in one or more clusters of the second module and a representative toggle weight factor for each cluster of the one or more clusters of the second module.

5. The method of claim 1, wherein determining power consumption of the circuit layout is based on at least instrument logic for modules in a plurality hierarchical levels of the circuit layout.

6. The method of claim 1, wherein the first module is a memory block, and at least one of the netlists that toggle is a power arc comprising a source pin, a target pin, and a conditional pin, further comprising determining a power consumption based on an average power for the cluster and a number of times that the power arc is activated within a window comprising multiple clock cycles.

7. The method of claim 1, further comprising displaying an alert when a peak power consumption exceeds a pre-selected threshold.

8. The method of claim 1, further comprising modifying a circuit component in the first module when the power consumption exceeds a pre-selected threshold.

9. The method of claim 1, further comprising providing, to a display, a waveform representing multiple toggles for a netlist in the first module, and detecting a trigger from the waveform, the trigger indicative of a toggle rate for the netlist based on a clock signal.

10. A system, comprising:
a memory storing a sequence of instructions; and
a processor to execute the sequence of instructions to cause a set of acts comprising:
selecting a first module of a circuit layout;
identifying multiple netlists that toggle in the first module during a number of clock cycles;
grouping the netlists that toggle into multiple clusters based on a toggle weight factor for each netlist of the netlists that toggle;
generating instrument logic for determining power consumption of the circuit layout based on a at least a number of netlists that toggle in each cluster and a representative toggle weight factor for each cluster of the multiple clusters;
merging, with a compiler tool, the instrument logic with the circuit layout into an executable file for an emulator tool; and
evaluate the power consumption of the circuit layout with the emulator tool.

11. The system of claim 10, wherein grouping the netlists that toggle into multiple clusters comprises compiling the circuit layout into register transfer level executable code, and determining power consumption for the circuit layout comprises executing the register transfer level executable code.

12. The system of claim 10, wherein evaluating a power consumption of the circuit layout comprises detecting a peak power consumption and capturing a time window of a circuit emulation that corresponds to the peak power consumption.

13. The system of claim 10, wherein the set of acts further comprise selecting a second module of the circuit layout in a same hierarchical level of the circuit layout as the first module, and determining a power consumption of the same hierarchical level of the circuit layout based on at least the number of netlists that toggle in each cluster of the first module and a representative toggle weight factor for each cluster of the multiple clusters of the first module, and a number of netlists that toggle in one or more clusters of the second module and a representative toggle weight factor for each cluster of the one or more clusters of the second module.

14. The system of claim 10, wherein determining power consumption of the circuit layout is based on at least instrument logic for modules in a plurality hierarchical levels of the circuit layout.

15. The system of claim 10, wherein the first module is a memory block, and at least one of the netlists that toggle is a power arc comprising a source pin, a target pin, and a conditional pin, and the processor executes instructions to determine a power consumption based on an average power for the cluster and a number of times that the power arc is activated within a window comprising multiple clock cycles.

16. A non-transitory computer readable medium, having stored thereon a set of configuration information for configuring a gate array or generating an application specific integrated circuit, the set of configuration information, when implemented performs a set of acts, the set of acts comprising:
selecting a first module of a circuit layout;
identifying multiple netlists that toggle in the first module during a number of clock cycles;
grouping the netlists that toggle into multiple clusters based on a toggle weight factor for each netlist of the netlists that toggle;
generating instrument logic for determining power consumption of the circuit layout based on a at least a number of netlists that toggle in each cluster and a representative toggle weight factor for each cluster of the multiple clusters;
merging, with a compiler tool, the instrument logic with the circuit layout into an executable file for an emulator tool; and
evaluating the power consumption of the circuit layout with the emulator tool.

17. The computer readable medium of claim 16, wherein grouping the netlists that toggle into multiple clusters comprises compiling the circuit layout into register transfer level executable code, and determining power consumption for the circuit layout comprises executing the register transfer level executable code.

18. The computer readable medium of claim 16, wherein evaluating a power consumption of the circuit layout comprises detecting a peak power consumption and capturing a time window of a circuit emulation that corresponds to the peak power consumption.

19. The computer readable medium of claim 16, further comprising selecting a second module of the circuit layout in a same hierarchical level of the circuit layout as the first module, and determining a power consumption of the same hierarchical level of the circuit layout based on at least the number of netlists that toggle in each cluster of the first module and a representative toggle weight factor for each cluster of the multiple clusters of the first module, and a number of netlists that toggle in one or more clusters of the second module and a representative toggle weight factor for each cluster of the one or more clusters of the second module.

20. The computer readable medium of claim 16, wherein determining power consumption of the circuit layout is based on at least instrument logic for modules in a plurality hierarchical levels of the circuit layout.

21. The computer readable medium of claim 16, wherein the first module is a memory block, and at least one of the netlists that toggle is a power arc comprising a source pin, a target pin, and a conditional pin, further comprising determining a power consumption based on an average power for the cluster and a number of times that the power arc is activated within a window comprising multiple clock cycles.

* * * * *